(No Model.)
M. H. & T. D. OWEN.
COTTON PLANTER.
No. 452,313. Patented May 12, 1891.
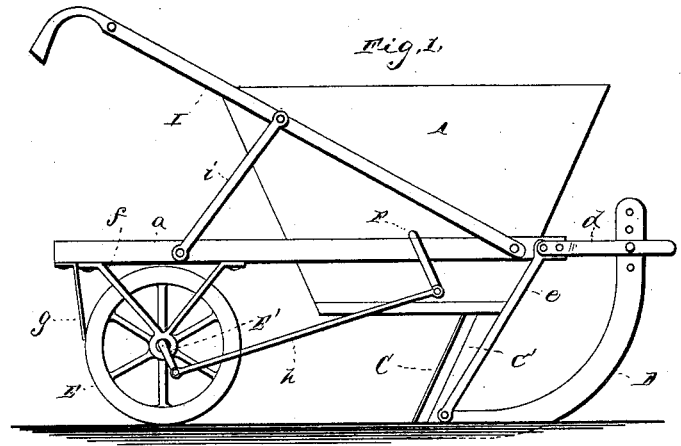
Fig. 1.
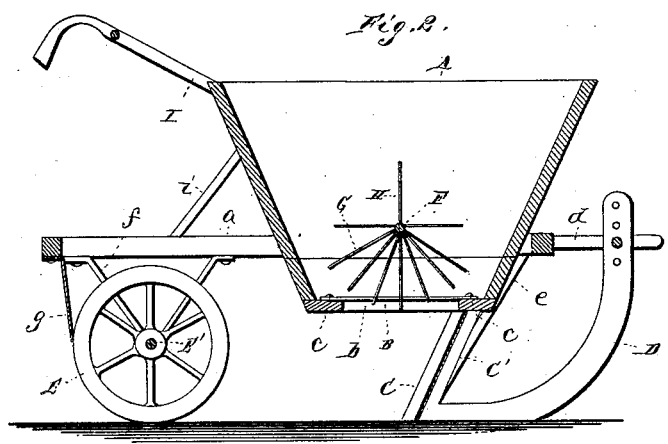
Fig. 2.
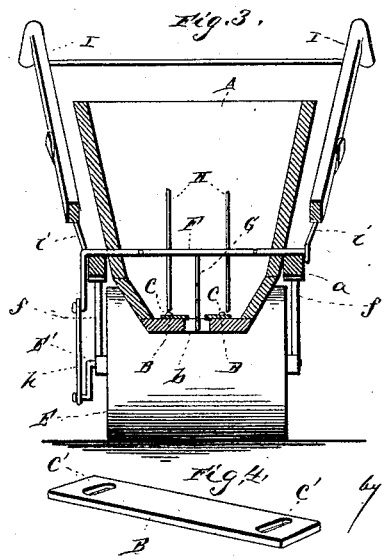
Fig. 3.
Fig. 4.
WITNESSES
Chas. L. Taylor
Phil C. Masi
INVENTORS
M. H. Owen
T. D. Owen
by E. W. Anderson
Attorney

UNITED STATES PATENT OFFICE.

MATTHEW H. OWEN AND THOMAS D. OWEN, OF BROWNSVILLE, TENNESSEE.

COTTON-PLANTER.

SPECIFICATION forming part of Letters Patent No. 452,313, dated May 12, 1891.

Application filed August 9, 1890. Serial No. 361,521. (No model.)

*To all whom it may concern:*

Be it known that we, MATTHEW H. OWEN and THOMAS D. OWEN, citizens of the United States, and residents of Brownsville, in the county of Haywood and State of Tennessee, have invented certain new and useful Improvements in Cotton-Planters; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side view. Fig. 2 is a vertical section. Fig. 3 is a vertical transverse section, and Fig. 4 is a view of the slide B.

This invention relates to certain improvements in cotton-planters; and it consists in the novel construction and combination of parts, as hereinafter disclosed.

In the embodiment of our invention we provide a suitable hopper A to hold the cotton-seed for planting, mounted in a frame $a$ and having its sides at the bottom inclined inward and downward to concentrate its contents thereat.

In the bottom of the hopper A is a longitudinal discharge-opening $b$, through which the cotton-seed is dropped, and upon the said bottom inside of the hopper are adjustably held slides B B by set-screws $c$, passing through transverse slots $c'$ therein and projecting from said bottom. These slides are arranged one upon each side of said discharge-opening to regulate the dropping capacity of the latter according to the amount of seed it may be desired to plant.

C is the downward and rearward inclined seed-spout, secured to the under side of the hopper-bottom at the forward end of the discharge-opening $b$ for passing the seed to the ground. This spout has at its front side centrally of its length an edgewise-disposed plate extension or blade $C'$, and connecting with the lower forward edge of the latter at its inner end is a curved runner or shoe D for opening the furrow or plowed ground connected near its upper end to the hopper-frame $a$ by a bracket or yoke $d$.

$e\ e$ are braces connecting at their lower ends with the runner or shoe D at the point of union of the latter with the spout C and at their upper ends with the sides of the hopper-frame $a$ near its forward end.

E is the covering or pressing roller hung or journaled by a cranked axle $E'$ in and between the lower ends of pendants or arms $f$, depending from the hopper-frame $a$ near its rear end for covering and pressing the loose earth or soil upon the deposited seed. A suitable scraper $g$ in the form of a bent metal plate is secured to the hopper-frame $a$ upon the under side of its rear cross-piece, so as to engage and remove any adhering earth from the roller E.

F is a cranked rock-shaft hung or journaled in the sides of the hopper A and carrying within the same a series of radial segmentally-arranged feeders G, adapted to reciprocate in and pass or feed the cotton-seed through the discharge-opening $b$ in the bottom of said hopper into the spout C. The rock-shaft F also carries within the hopper A a number of agitators or cross-arms H upon each side of the feeders G to thoroughly free the cotton-seed of adhering lint or fiber and to aid in loosening the bulk of the seed in the hopper, preventing the same sticking in the latter. The crank-shaft F is reciprocated by a pitman $h$, connected to its crank and to the crank of the roller-axle.

I I are the usual guiding-handles, fixed at their forward ends to the sides of the hopper-frame $a$ at its front end and connected near their middles to said frame by side pieces $i\ i$, upholding the handles in their oblique position.

Having described this invention, what we claim, and desire to secure by Letters Patent, is—

In a cotton-planter, the combination of the hopper and its feed-adjusting device, the rock-shaft carrying the feeders and agitators, the rearwardly-inclined feed-spout having at its front side centrally of its length an edgewise plate extension or blade having connected to its lower forward edge the inner end of a curved runner or shoe adjustably connected near its upper end to a bracket or yoke of the hopper-frame, the braces $e\ e$, the covering-wheel, and the crank-and-pitman connection between said wheel and the rock-shaft, substantially as specified.

In testimony whereof we affix our signatures in presence of two witnesses.

MATTHEW H. OWEN.
THOMAS D. OWEN.

Witnesses:
J. A. MORTON,
R. T. DAVIS.